(12) United States Patent
Krishnakumar et al.

(10) Patent No.: US 9,507,015 B2
(45) Date of Patent: Nov. 29, 2016

(54) DEVICE PROXIMITY DETECTION

(71) Applicant: Avaya Inc., Basking Ridge, NJ (US)

(72) Inventors: Anjur Sundaresan Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 185 days.

(21) Appl. No.: 14/047,650

(22) Filed: Oct. 7, 2013

(65) Prior Publication Data

US 2015/0096375 A1    Apr. 9, 2015

(51) Int. Cl.
*G01S 7/481*    (2006.01)
*G01S 17/00*    (2006.01)
*G01S 17/02*    (2006.01)

(52) U.S. Cl.
CPC ............ *G01S 7/4816* (2013.01); *G01S 17/003* (2013.01); *G01S 17/023* (2013.01); *G01S 17/026* (2013.01)

(58) Field of Classification Search
CPC ................................ G01S 17/02; G01S 17/46
USPC ............ 356/3.01–3.15, 4.01–4.1, 5.01–5.15
See application file for complete search history.

(56) References Cited

U.S. PATENT DOCUMENTS

| 6,373,557 | B1 * | 4/2002 | Mengel | B60N 2/002 356/4.07 |
| 6,400,447 | B1 * | 6/2002 | Kirk | G01C 1/02 356/4.07 |
| 2002/0027651 | A1 * | 3/2002 | Jackson | G01B 11/2755 356/139.09 |
| 2010/0082490 | A1 * | 4/2010 | Rosenblatt | G06Q 20/32 705/64 |
| 2013/0033694 | A1 * | 2/2013 | Puig | 356/4.07 |
| 2013/0182246 | A1 * | 7/2013 | Tanase | G06F 3/042 356/218 |

OTHER PUBLICATIONS

Zhour et al, "Research on Binarization of QR code Image", Multimedia Technology (ICMT), 2010 International Conference Oct. 31, 2010, Print ISBN: 978-1-4244-7871-2, IEEE.*

* cited by examiner

*Primary Examiner* — Luke Ratcliffe
(74) *Attorney, Agent, or Firm* — Sheridan Ross P.C.

(57) ABSTRACT

The present disclosure is directed to systems and methods that include measuring a luminance; comparing the luminance to a predetermined luminance threshold; and if the luminance is below the predetermined luminance threshold, determining a proximity to an external device.

20 Claims, 9 Drawing Sheets

DEVICE PROXIMITY DETECTION

TECHNICAL FIELD

The present disclosure relates to systems and methods for detecting devices. In particular, the present disclosure relates to systems and methods for detecting proximity of devices using luminance.

BACKGROUND

Electronic devices (also referred to herein as "devices"), such as cellular phones, laptops, and tablets, among others, are common in the consumer market. When two users want to exchange information between their electronic devices, the users are usually required to establish a communication channel between the two electronic devices. Some short-range communication protocols like Near-Field Communication (NFC) require the two devices to be extremely close to each other before a data exchange can be initiated. There are a number of ways of detecting proximity. Examples of existing proximity-detection mechanisms include Infrared (IR)-based proximity sensors, ultrasonic sensors, wireless or Bluetooth-based proximity detection, global positioning system (GPS) based proximity detection, and other server-based proximity detection.

SUMMARY

A need exists for improved proximity detection methods and systems. In particular, it would be desirable to improve proximity detection mechanisms for devices that desire to exchange information.

Prior art proximity detection solutions are problematic in that they are not accurate in determining which devices are meant to detect each other to enable a connection for the exchange of information. For example, many prior art solutions require devices to detect if they are at the same place at the same time (e.g., synchronized in time). However, devices may not always recognize that they are at the same place at the same time because typical devices have limitations in their ability to estimate position as well as time. In fact, position and time estimates oftentimes range from spot-on to wildly inaccurate using prior art solutions.

For example, a position estimate may be determined by any of several methods and need not include coordinates such as latitude, longitude and altitude. Sometimes other indications, for example an identifier specifying a network node with which a device is communicating, may be sufficient. Position estimates may come from global navigational satellite system (GNSS) receivers, of which GPS receivers are the most common example. Position may be estimated by, and provided as a service of, a cellular radio network such as an EDGE or 3G network. Also, relative position may be estimated by environmental parameters near devices and determining whether or not such parameters reported by two different devices match. Absolute and/or relative position estimates may also be obtained by combining estimates from two or more sources. These position estimates are further complicated by the fact that accuracy or acceptable position uncertainty may depend on what the position estimate is used for: thus, "same place" and "nearby" may have different accuracy requirements depending on the source or application, for example.

In addition, prior art solutions for devices to detect proximity often assume the presence of specific underlying technology, e.g., IR, on the device. However, such solutions have problems. For example, many prior art solutions have problems with the range of their device detection because the detection range using prior art technologies is on the order of meters. This means that one device will detect all devices within a predetermined detection range. For example, Bluetooth or WiFi-based proximity detectors have too long a range and, therefore, do not work well for short-range proximity detection. GPS and server-based technologies also have the limitation that the location cannot be determined with sufficient accuracy in certain environments in order to accurately detect devices within a predetermined proximity.

Further, there is difficulty in determining if multiple devices are synchronized in time in many prior art solutions for detecting proximity. For example, device clocks may be offset from the true time so that they may not share reference to a common time. Also, status reports are considered to exist when sent and any delay between creating a report in a device and sending it from the device to the network is treated as if it were part of the overall transmission delay between device and server.

Thus, what is needed is a simple and quick way for devices to detect proximity when they physically meet each other. Further, what is needed is a robust method to detect desired devices to connect with, so that connections between devices are made only when intended and only to the intended recipient. The present disclosure is directed to methods and systems for detecting proximity of devices, and detecting proximity of devices without a need for communication with a server.

Various embodiments of the present disclosure are directed to methods of measuring a luminance; comparing the luminance to a predetermined luminance threshold; and if the luminance is below the predetermined luminance threshold, determining a proximity to an external device. If the luminance is not below the predetermined luminance threshold, the methods include repeating the measuring and the comparing until the luminance is below the predetermined luminance threshold to determine the proximity.

Further embodiments are directed to communication systems including a first device; a second device; and a module configured to use the first device to measure a luminance, compare the luminance to a predetermined number, and if the luminance is below the predetermined number, to determine a proximity to the second device. If the luminance is not below the predetermined number, the methods include repeating the measuring and the comparing until the luminance is below the predetermined number to determine the proximity.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

Exemplary embodiments of the present disclosure are described in conjunction with the appended figures where.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Many devices are equipped with one or more image capture devices (e.g., cameras and video recorders) that can collect information about an object within an image capture region. In accordance with at least some embodiments of the present disclosure, a device may comprise any type of known electronic equipment or collection of electronic equipment. Examples of suitable devices may include, but are not limited to, a camera, a video recorder, a personal computer, a laptop, a mobile device, a cellular phone, a smartphone, a telephone, or other electronic device equipped with one or more sensors capable of measuring luminance. Various of these devices may include a telephony application or other connectivity application. In general, each device may provide many capabilities to the user engaging the device. These capabilities may include, but are not limited to, video, audio, text, applications, and/or data communications. The type of medium used by the device to communicate with other devices or a user may depend upon the communication applications available on the device.

Certain image capture devices (also known as electronic imaging devices) can take video or still photographs, or both, by digitally recording images using an electronic image sensor to obtain image data within an image capture region. The continuing decrease in manufacturing costs of electronic imaging devices, combined with increasing functionality and enhanced user interfaces, have led to increased and widespread usage. Digital cameras and/or video cameras are found not only as freestanding devices, but are also incorporated into other electronic devices. For example, such devices may be incorporated into computers, mobile phones, handheld computing devices, and the like. These devices may also be used as computing peripherals to permit image capture, video conferencing, video chatting and so on.

Many image capture devices employ a photosensor made of a grid of light-sensitive pixels. These pixels may measure light intensity (e.g., luminance) impacting them. Luminance is a photometric measure of the luminous intensity per unit area of light travelling in a given direction. Equation 1 below shows a mathematical representation of luminance as a derivative:

$$L_v = \frac{d^2 \Phi_v}{dA d\Omega \cos\theta} \quad (1)$$

In Equation 1, $L_v$ is the luminance (cd/m$^2$), $\Phi_v$ is the luminous flux or luminous power (lm), $\theta$ is the angle between the surface normal and the specified direction, A is the area of the surface (m$^2$), and $\Omega$ is the solid angle (sr).

Luminance is often used to characterize emission or reflection of light from flat, diffuse surfaces. The luminance indicates how much luminous power will be detected by an eye looking at the surface from a particular angle of view. Luminance is, therefore, an indicator of how bright the surface will appear. Thus, using photosensors, devices may process electronic representations of light intensity to derive luminance portions of the image resulting in one or more luminance measurements (also referred to as luminance). In various embodiments of this disclosure, measurements of luminance are used to detect proximity of devices.

In illustrative embodiments, luminance may not be measured directly; rather, an arithmetic mean of the grayscale pixel values in the image being captured may be calculated and compared with (and without) possible occlusion. Such a calculation may be referred to as measurements of luminance or a luminance measurement, as disclosed herein. The grayscale pixel values are proportional to the luminance of the pixel. A predetermined number (e.g., a threshold or setting) may be set on the arithmetic mean of the grayscale pixel values (e.g., the luminance measurement(s)). As used herein, a threshold may also be referred to as a dark threshold.

For example, when two devices having image capture devices are brought close to each other (e.g., having a sensor to sensor arrangement, or sensor to object arrangement, or with their backs to each other), the image capture devices on the phones start getting blocked as they come closer until the images begins to become obscured, thereby decreasing the amount of light intensity from the image. In other words, the pixel values in an image being captured by an electronic imaging device are proportional to the luminance being captured by the device, thereby allowing a digital camera to act as a luminance meter. Thus, each pixel in the light sensor of the image capture device becomes a luminance sensor. Measurements of luminance of the image being captured are used to determine a decrease in luminance (e.g., a blockage of the camera image as it nears another device). Thus, measurements of luminance may detect a closeness of devices (e.g., a proximity of one device to another), and the methods and systems disclosed herein may advantageously allow for proximity detection of devices without requiring any connection to a server or network or any communication between devices.

In various embodiments, when a luminance measurement is approaching the threshold, or is reduced below a predetermined threshold, or becomes closer to zero, a devices may determine it is in proximity to another device. In certain aspects, such a determination may precede or assist other actions, such as detection of another device, or connection to another device, for example. In various aspects, devices may detect proximity when the luminance is at or below about 40 $cd/m^2$, or at or below 35 $cd/m^2$, or at or below 30 $cd/m^2$, or at or below 25 $cd/m^2$, or at or below 20 $cd/m^2$, or at or below 15 $cd/m^2$, or at or below 10 $cd/m^2$, or at or below 5 $cd/m^2$, or at or below 3 $cd/m^2$, or at or below 1 $cd/m^2$. The luminance threshold to detect proximity of devices may vary depending on the type of devices (including the type of image capture devices or other devices into which the image capture device is incorporated), or the type of connection desired to be made between devices. In embodiments, the luminance threshold to detect proximity may be pre-set depending on the device or application, or it may be adjustable.

In further embodiments, devices may use other various methods to detect proximity using luminance. For example, the image capture region may be divided into several sections, and when a certain number of the sections have their luminance measurement fall below a certain threshold, the devices may detect proximity to each other. Other variations are also possible; e.g., pixels may be divided up into any shape or sized sections, or luminance measurements per pixel may be used in combination with averages calculated over areas of the image capture region or the entire image capture region. As a specific example, an image capture region may be divided into a number of segments, and a luminance measurement may be calculated for each segment. If over 50% of the segments have a luminance measurement below the dark threshold, the methods disclosed herein may determine that devices are in proximity.

Still further, in various embodiments, other measurements or information may be used in combination with luminance. For example, measurement of change in luminance may be correlated with a pattern of accelerometer measurements, where the accelerometer measurements indicate that at least one of the devices is moving towards another. In particular, this type of accelerometer measurement could be detected by an initial period of acceleration of the device, followed by a period of deceleration and further followed by a period of near-zero acceleration, as discussed further below. Such methods may advantageously reduce false positives (e.g., a device attempting to detect proximity to another device when such an act was not intended to occur by a user of the device).

The proximity detection discussed herein may be triggered by an application on the device, which may be enabled only when the device needs to detect proximity of another device. In various embodiments, the proximity detection discussed herein could be triggered by other methods or systems, including pressing a dedicated button or a particular button for a predetermined amount of time (e.g., holding a volume button or home screen button while the phone is asleep or hibernating or displaying the home screen). Illustrative examples of such applications are provided and described herein, but are not limited. Such applications may have various features; for example, they may incorporate a predetermined amount of time during which they attempt to detect a device, and if no device is detected, the application may close. Also, such applications may interact with a user of a device, providing instructions to the user on how to use the application (e.g., request that the user select a setting for the proximity detection and instruct the user to bring the device closer to the other device, as well as inform the user of success, status, or failure of the proximity detection). Applications on devices for use in accordance with methods and systems disclosed herein may incorporate other applications to complete the proximity detection. For example, applications having a luminance measurement capability, or portions of a luminance measurement capability, may be used.

Figure 1:
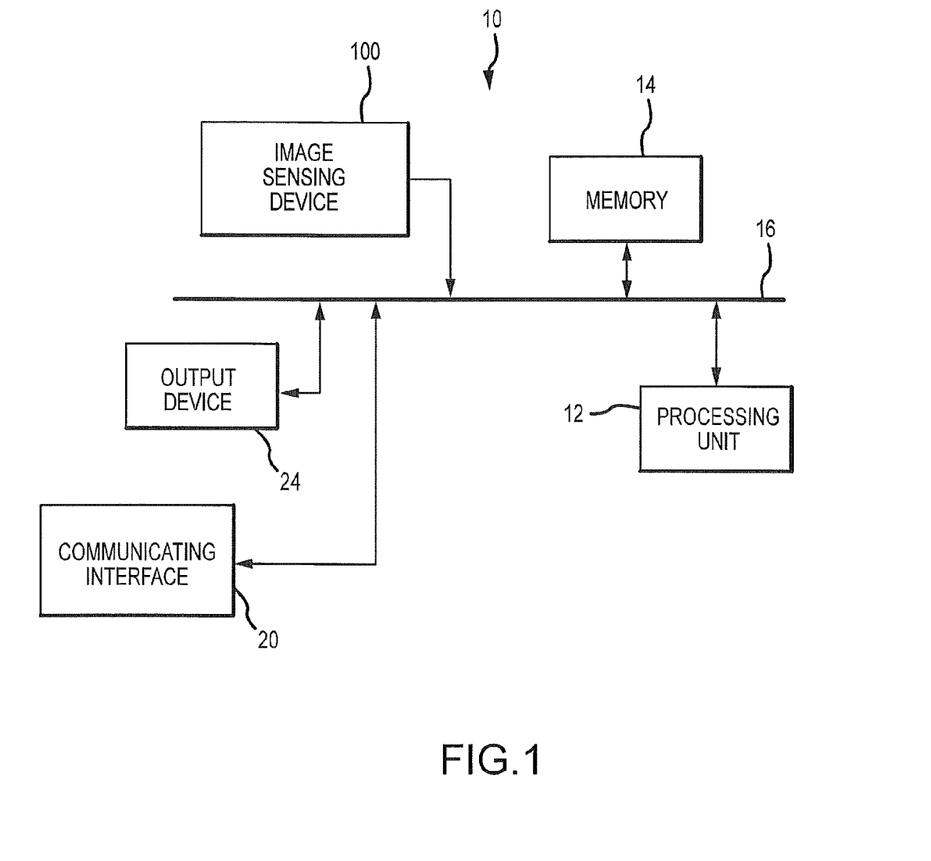
FIG. 1 is a block diagram of an illustrative system in accordance with various embodiments of the present disclosure.

Turning to FIG. 1, a functional block diagram is depicted illustrating certain components of one embodiment of an electronic device 10 that includes an example image sensing device 100 (e.g., an image capture device). The electronic device 10 may include a processing unit 12, a memory 14, a communication interface 20, image sensing device 100, an output device 24, and a communication path 16. The communication path 16 (which can be a digital bus) may couple two or more system components including, but not limited to, memory 14 and processing unit 12. Other illustrative embodiments may include more or fewer components.

As shown in FIG. 1, the image sensing device 100 (e.g., an image capture device) may be configured to receive incoming light through an image capture region and convert it to one or more image signals. The image signals may be digital signals, analog signals, or both. In some embodiments, the image sensing device 100 may transmit the image signals via the communication path 16 to the memory 14, which may store the image signals received from the image sensing device 100 before or after conveying the signals to the processing unit 12. Alternatively, the image signals may be transmitted from the image sensing device 100 to the processing unit 12, bypassing the memory 14. In either case, the processing unit 12 may use the image signals to construct an image. As part of this process, the processing unit 12 may adjust the color values of the image data or otherwise manipulate the image data. The final full-color image may be outputted to an output device 24 either integrated into or outside of the imaging device, or may be stored in memory 14. Likewise, the final image and information associated with the image, such as luminance measurements, may be made available for access or storage either within or outside of the image sensing device 100.

The memory 14 may tangibly embody one or more programs, functions, and/or instructions that can cause one or more components of electronic device 10 (e.g., image sensing device component 100) to operate in a predefined manner as described herein. The memory 14 may include removable or fixed, volatile or non-volatile, or permanent or re-writable computer storage media. The memory 14 can be any available medium that can be accessed by a general purpose or special purpose computing or image processing device. For example, such a computer readable medium can include flash memory, random access memory, read only memory, electrically erasable programmable read only memory, optical disk storage, magnetic storage, or any other medium that can be used to store digital information.

In various embodiments, the processing unit 12 (which may be dedicated to image processing or may encompass other functions) may be configured to convert the image signals to digital data. The processing unit 12 can be any of various commercially available processors, including, but not limited to, a microprocessor, central processing unit, and so on, and can include multiple processors and/or co-processors. Other embodiments may include firmware or software configured to perform the functions of the described processing unit. In some embodiments, a communication interface 20 may facilitate data exchange between the electronic device 10 and another device, such as a host computer or a server.

In some embodiments, the electronic device 10 may further include an output device 24 configured to receive the image signals from the image sensing device 100 and display the image signals for viewing. The output device 24 may be any type of component that is capable of displaying image signals, including but not limited to, a liquid crystal display, a light-emitting diode display, a plasma display, and an organic light-emitting diode display. In other embodiments, the output device 24 may not be resident in the electronic device 10, but may be a separate component that may be connected to the electronic device 10 to receive the image signals, such as a monitor, television, projector, and so on. The output device 24 may interface with other components on the electronic device 10, such as applications on the electronic device 10.

Figure 2:
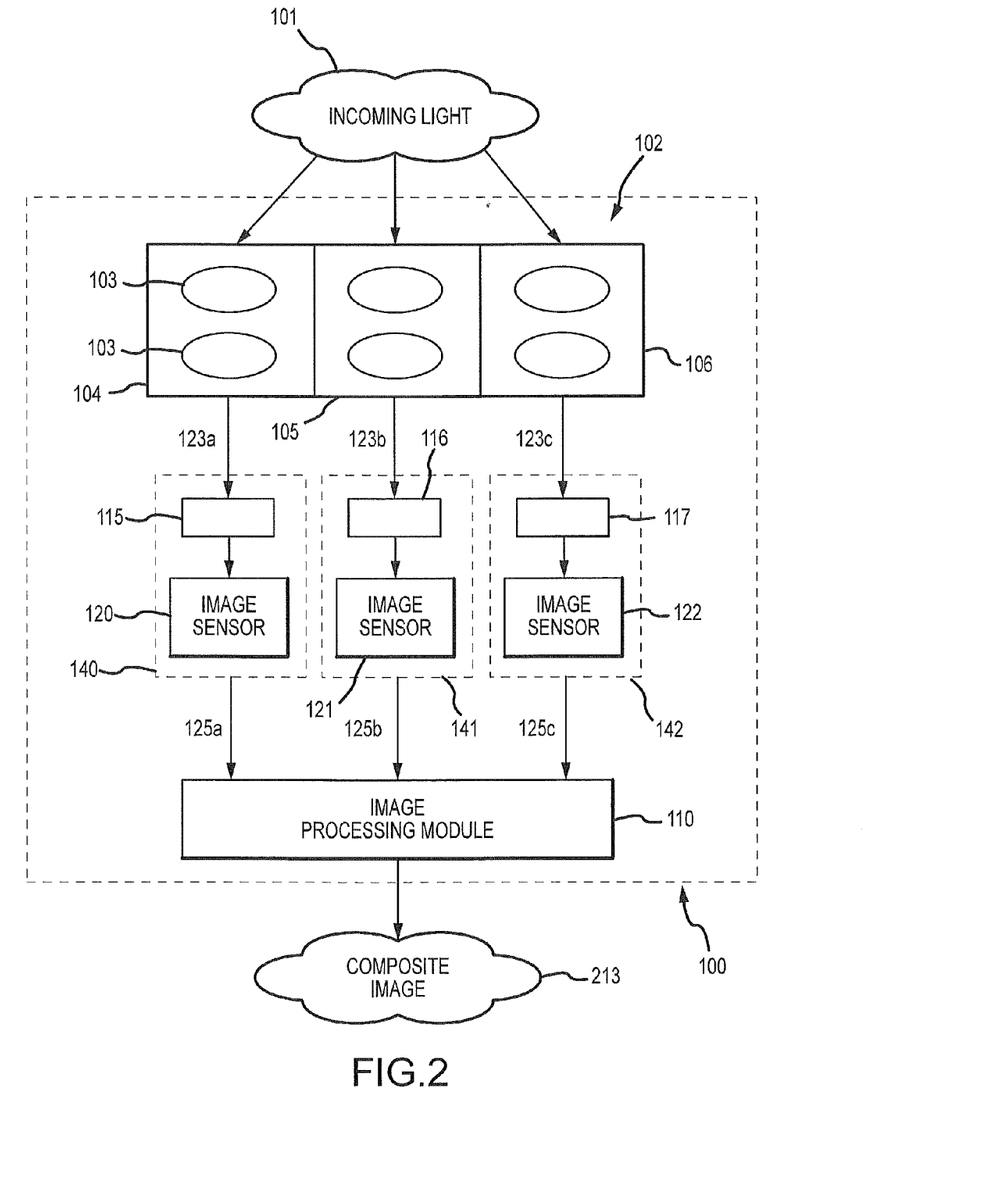
FIG. 2 is a block diagram of an illustrative image sensing device in accordance with various embodiments of the present disclosure.

FIG. 2 is an illustrative functional block diagram of some embodiments of an image sensing device 100 for capturing and storing image data. The image sensing device 100 may be a component within an electronic device 10, as shown in FIG. 1. However, in other embodiments, the image sensing device 100 may be a component within other types of electronic devices that may include additional or fewer components than the electronic device 10 shown in FIG. 1. For example, the image sensing device 100 may be employed in a standalone digital camera, a media player, a mobile phone, a tablet, and other devices.

As shown in FIG. 2, the image sensing device 100 may include a lens assembly 102, a first chrominance sensor 140, a luminance sensor 141, a second chrominance sensor 142, and an image processing module 110. In some embodiments, the lens assembly 102 may include three parallel lens trains 104, 105, 106. Each lens train 104, 105, 106 may have one or more optically aligned lens elements 103. In various embodiments, the parallel lens trains 104, 105, 106 may be configured to receive incoming light 101 and refract the light 123a, 123b, 123c to a luminance sensor 141 and first and second chrominance sensors 140, 142. The lens trains 104, 105, 106 may each be configured to transmit light to an associated luminance or chrominance sensor 140, 141, 142. The luminance sensor 141 may be configured to capture a luminance component of incoming light passed by its respective parallel lens train 105. In some embodiments, the lens assembly 102 may include a lens block with one or more separate lens elements 103 for each parallel lens train 104, 105, 106.

The first chrominance sensor 140 may include a first filter 115 and a first image sensor 120 associated with the first filter 115. The luminance sensor 141 may have a second filter 116 and a second image sensor 121 associated with the second filter 116. The second chrominance sensor 142 may have a third filter 117, and a third image sensor 122 associated with the third filter 117.

As shown in FIG. 2, the filters 115, 116, 117 may be positioned between the first, second, and third image sensors 120, 121, 122 and an object, such that light reflected off the object passes through a filter 115, 116, 117 and impacts a corresponding image sensor 120, 121, 122. The image sensors 120, 121, 122 may be any electronic sensor capable of detecting various wavelengths of light, such as those commonly used in digital cameras, digital video cameras, mobile telephones and personal digital assistants, web cameras, and so on and so forth.

In some embodiments, the first, second, and third image sensors 120, 121, 122 may be formed from an array of color-sensitive pixels. That is, each pixel of the image sensors 120, 121, 122 may detect at least one of the various wavelengths that make up visible light. The signal generated by each such pixel may vary depending on the wavelength of light impacting it so that the array may thus reproduce a composite image of the object 213.

The first and third filters 115, 117 may overlay the first and third image sensors 120, 122 and allow the image sensors to capture the chrominance portions of a sensed image, such as chrominance images 125a and 125c. Similarly, the second filter 116 may overlay the second image sensor 121 and allow the image sensor 121 to capture the luminance portion of a sensed image as a luminance image 125b. The luminance image 125b, along with the chrominance images 125a and 125c, may be transmitted to an image processing module 110. The image processing module 110 may combine the luminance image 125b captured by and transmitted from the luminance sensor 141 with the chrominance images 125a, 125c captured by and transmitted from the chrominance sensors 140, 142, to output a composite image 213.

In some exemplary embodiments, the luminance of an image may be expressed as a weighted sum of red, green and blue wavelengths of the image, as shown in Equation 2:

$$L = 0.59G + 0.3R + 0.11B \qquad (2)$$

In Equation 2, L is luminance, G is detected green light, R is detected red light, and B is detected blue light. The chrominance portion of an image may be the difference between a full color image and a luminance image. Accordingly, the full color image may be the chrominance portion of the image combined with the luminance portion of the image.

For digital images, the luminance of an image may be expressed as a different weighted sum of red, green and blue wavelengths of the image, as shown in Equation 3:

$$L=0.2126R+0.7152G+0.0722B \quad (3)$$

In Equation 3, all the color intensities are linearized and L is luminance, G is detected green light, R is detected red light, and B is detected blue light. Various embodiments of the present disclosure may be implemented without any direct calculation of the luminance according to Equations 2 and 3, as described herein.

In some embodiments, the luminance sensor 141 may be an image sensor 121 that has a higher pixel count than that of the chrominance sensors 140, 142. Accordingly, the luminance image 125*b* generated by the luminance sensor 141 may be a higher resolution image than the chrominance images 125*a*, 125*b* generated by the chrominance sensors 140, 142. In other embodiments, the luminance image 125*b* may be stored at a higher resolution or transmitted at higher bandwidth than the chrominance images 125*a*, 125*c*. In some embodiments, the luminance sensors 141 may lack any filter 116 or may use a filter that has increased optical transmission, as compared to that of the color filters 115, 117. In various embodiments, an image sensor without a filter or using a filter having an increased optical transmission may detect substantially the full intensity of incoming light and allow for smaller pixels while absorbing the same number of photons per second. This may permit the image sensors 121 to have a higher sampling rate, improved light efficiency, and/or sensitivity. For example, the luminance sensor 141 may be configured to sense light at any wavelength and at substantially all pixel locations. In other embodiments, the luminance sensor 141 may include a filter 116 that attenuates light as necessary to produce a response from the sensor that matches the response of the human eye. For example, in one embodiment, the filter 116 may produce a weighting function that mimics the response of the human eye.

The increased sensitivity of the luminance sensor 141 afforded by sensing the full or substantially full luminance of an image may be used in various ways to extend the performance of image sensing device 100 and its composite image 213 for use in methods of detecting proximity disclosed herein. For example, an image sensor with relatively small pixels may be configured to average the frames or operate at higher frame rates. Additionally, noise levels may be reduced by using less analog and/or digital gain to improve image compression and image resolution. Smaller lens apertures may be used to increase depth of field. Also, images may be captured in darker ambient lighting conditions.

Figure 3:
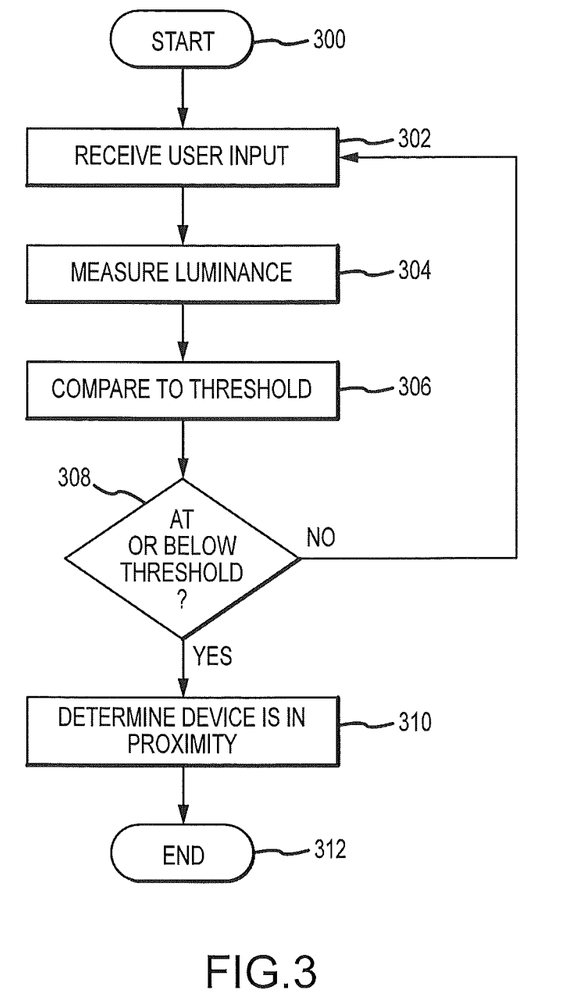
FIG. 3 is a flow diagram depicting a proximity detection method in accordance with various embodiments of the present disclosure.

FIG. 3 is an illustrative flow diagram of exemplary methods for detecting proximity of devices according to some embodiments. In step 300, the method of detecting proximity starts and in step 302, the system receives user input. The user input may be a user interacting with an application, for example, to initiate the application's detection of device proximity. Alternatively, the user input may be another interaction with the device (e.g., a specific pattern of movement of the device detected using accelerometer measurements).

In step 304, the system measures luminance using an image capture device. The system may measure luminance in various ways, for example, an approximation of luminance may be calculated using an arithmetic mean. Advantageously, using an arithmetic mean could allow for faster measurements of luminance. Alternatively or in combination with the calculation using an arithmetic mean, an overall average of luminance among all pixels in the image capture device may be used as the measurement. Thus, in some embodiments, a geometric mean could be used. In other embodiments, the system may measure luminance on a per-pixel (or a per-segment of the image capture region) basis.

In step 306, the system compares the luminance measurement(s) to a threshold, and determines whether the measurement(s) are at or below the threshold in step 308. If the measurement(s) are not at or below the threshold, the method returns to step 304 to gather another luminance measurement. If the measurement(s) are at or below the threshold, the method proceeds to step 310, where the device is determined to be in proximity to another device. In step 312, the method ends.

Figure 4:
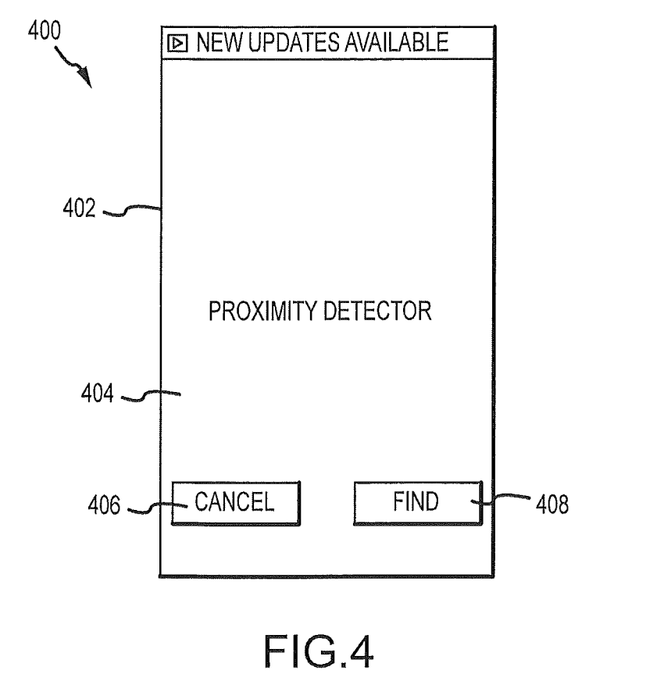
FIG. 4 is a first illustrative screen shot in accordance with various embodiments of the present disclosure.

Turning now to FIG. 4, an illustrative screen shot in accordance with various embodiments of the present disclosure. In FIG. 4, a mobile device 400 has an image 404 displayed on the screen 402. The image 404 shows an application for use in accordance with various embodiments of the present disclosure. In the image 404, a startup screen for the application is shown, with a cancel button 406 and a find button 408 for a user to cancel the application or find a luminance, respectively.

Figure 5:
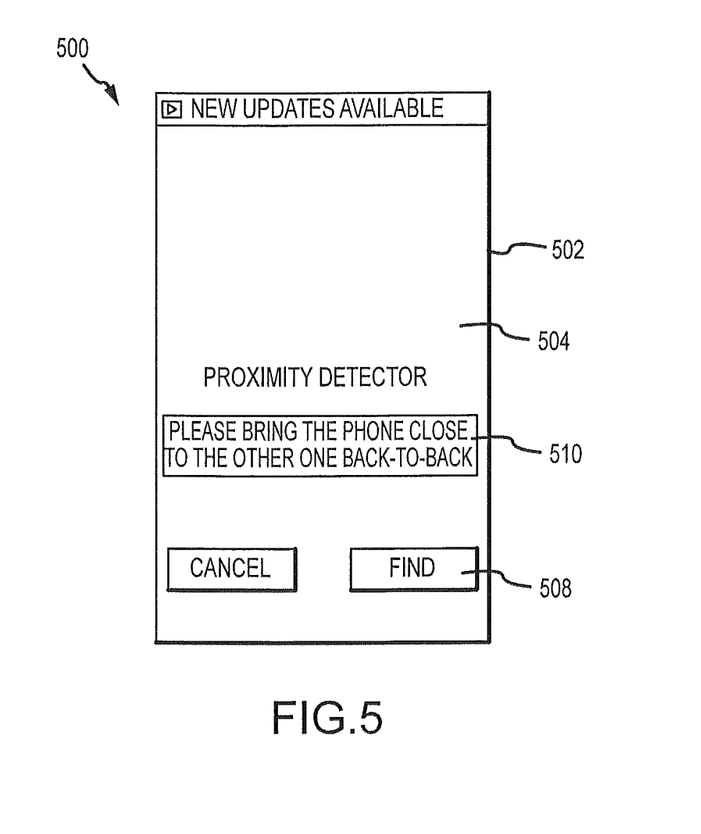
FIG. 5 is a second illustrative screen shot in accordance with various embodiments of the present disclosure.

FIG. 5 shows an illustrative screen shot in accordance with various embodiments of the present disclosure. In FIG. 5, a mobile device 500 has an image 504 displayed on the screen 502. The image 504 shows an application for use in accordance with various embodiments of the present disclosure. In the image 504, a screen for the application is shown, with information being conveyed to a user 510 instructing the user to bring the mobile device (e.g., the phone) close to another. The information 510 also instructs the user to bring the device "back-to-back" because in these embodiments, the mobile device 500 has a rear-facing camera (e.g., a camera on the back of the device), and the external device (not shown) which the user would like to detect also is a mobile device having a rear-facing camera (e.g., a camera on the back of the device). In various embodiments, image 504 may be shown after a user has selected the find button 508, or the image 504 may be displayed before a user selects the find button 508.

Figure 6:
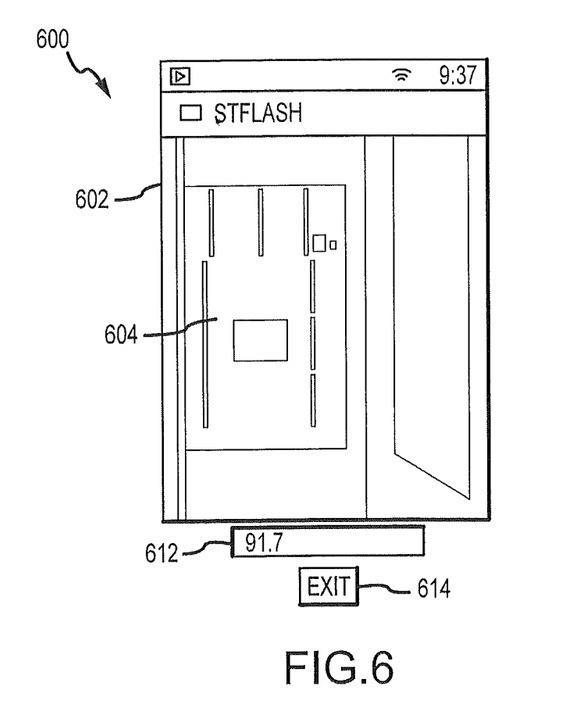
FIG. 6 is a third illustrative screen shot in accordance with various embodiments of the present disclosure.

FIG. 6 shows an illustrative screen shot in accordance with various embodiments of the present disclosure. In FIG. 6, a mobile device 600 has an image 604 displayed on the screen 602. The image 604 shows an application for use in accordance with various embodiments of the present disclosure. In the image 604, a screen for the application is shown, with an image 604 being captured through an image capture device incorporated into the mobile device 600 (e.g., a rear-facing camera). In various embodiments, the screen 602 also shows the user a luminance measurement based on the image 604, which shows "91.7," and this luminance measurement may not be below a predetermined value. Also, screen 602 displays an exit button 614 to exit the application. In certain embodiments, a luminance measurement may not be displayed on the screen 602.

Figure 7:
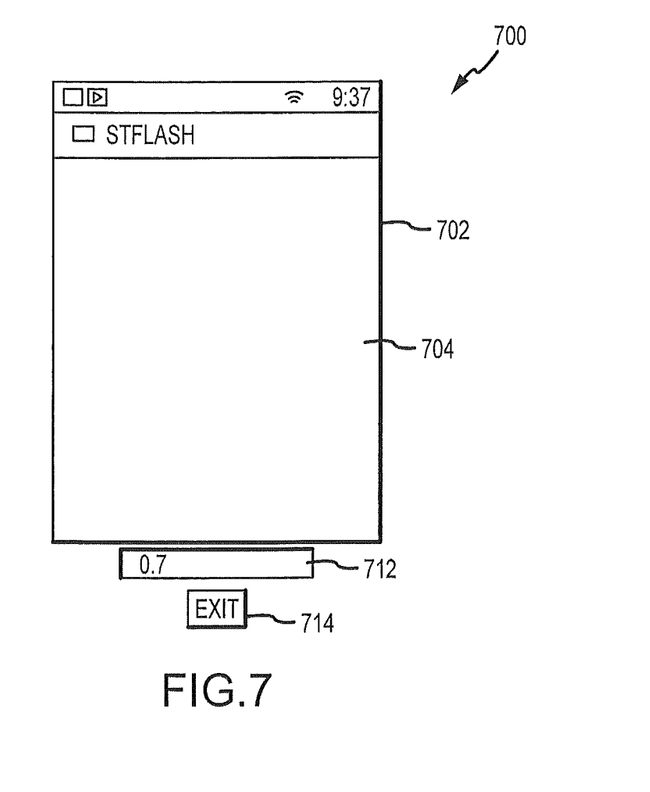
FIG. 7 is a fourth illustrative screen shot in accordance with various embodiments of the present disclosure.

FIG. 7 shows an illustrative screen shot in accordance with various embodiments of the present disclosure. In FIG. 7, a mobile device 700 has an image 704 displayed on the screen 702. The image 704 shows an application for use in accordance with various embodiments of the present disclosure. In the image 704, a screen for the application is shown, with an image 704 being captured through an image capture device incorporated into the mobile device 700 (e.g., a rear-facing camera). In various embodiments, the screen 702 also shows the user a luminance measurement based on the image 704, which shows "0.7," and this luminance measurement may be below a predetermined value. Also, screen 702 displays an exit button 714 to exit the application. In certain embodiments, a luminance measurement may not be displayed on the screen 702.

Figure 8:
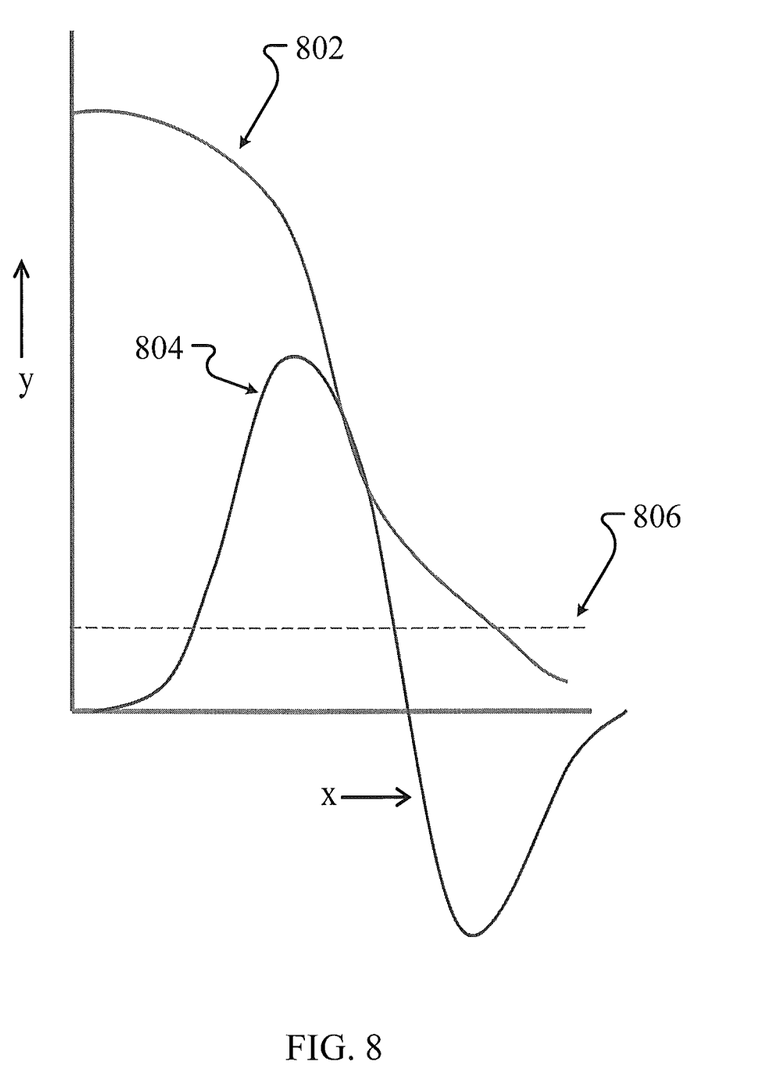
FIG. 8 is an illustrative graph showing a relationship of luminance and acceleration over time.

FIG. 8 shows an illustrative graph of a relationship between luminance and acceleration over time. In FIG. 8, luminance and acceleration are plotted on the y-axis versus time, which is plotted on the x-axis; thus, FIG. 8 shows a variation of luminance and a variation of acceleration over the same period of time. In particular, line 802 is a measurement of luminance, line 804 is a measurement of acceleration, and line 806 is a dark threshold. As shown in FIG. 8, the drop of luminance 802 below the dark threshold 806 is accompanied by an increase in acceleration 804 followed by a decrease in acceleration 804, where the acceleration may be measured using accelerometer readings as described herein.

Figure 9:
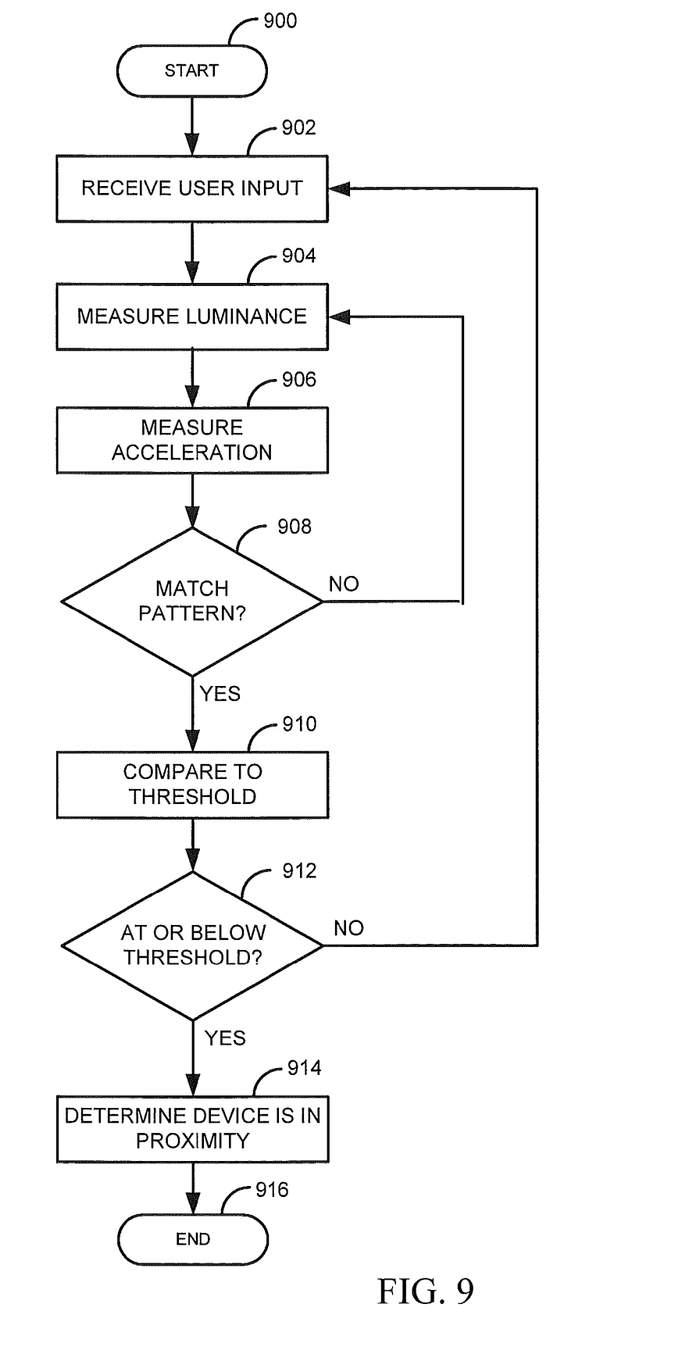
FIG. 9 is a flow diagram depicting a proximity detection method in accordance with various embodiments of the present disclosure.

FIG. 9 is an illustrative flow diagram of exemplary methods for detecting proximity of devices according to some embodiments. In step 900, the method of detecting proximity starts and in step 902, the system receives user input. The user input may be a user interacting with an application, for example, to initiate the application's detection of device proximity. Alternatively, the user input may be another interaction with the device (e.g., a specific pattern of movement of the device detected using accelerometer measurements).

In step 904, the system measures luminance using an image capture device. The system may measure luminance in various ways, for example, an approximation of luminance may be calculated using an arithmetic mean. Advantageously, using an arithmetic mean could allow for faster measurements of luminance. Alternatively or in combination with the calculation using an arithmetic mean, an overall average of luminance among all pixels in the image capture device may be used as the measurement. Thus, in some embodiments, a geometric mean could be used. In other embodiments, the system may measure luminance on a per-pixel (or a per-segment of the image capture region) basis.

In step 906, the system measures acceleration. In step 908, in various embodiments, the system compares the acceleration measurements to a pattern to determine if the measurements correspond to the pattern, e.g., a pattern of acceleration followed by deceleration that indicates that at least one of the devices is moving towards another. If the acceleration measurements match a pattern, the system proceeds to step 910 to compare the luminance measurement(s) to a threshold. If the acceleration measurements do not match the pattern, the system may return to step 904.

In step 910, the system compares the luminance measurement(s) to a threshold, and determines whether the measurement(s) are at or below the threshold in step 912. If the measurement(s) are not at or below the threshold, the method returns to step 904 to gather another luminance measurement. If the measurement(s) are at or below the threshold, the method proceeds to step 914, where the device is determined to be in proximity to another device. In step 916, the method ends.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
   measuring, at a first device and by a microprocessor of the first device, a luminance related to an external proximity to establish a communication channel that is based on the external proximity;
   comparing, by the microprocessor, the measured luminance to a predetermined luminance threshold; and
   if the measured luminance is below the predetermined luminance threshold, establishing, by the microprocessor, the communication channel;
   wherein the communication channel is established between the first device and an external device, the first device comprises a camera, and the luminance is measured using the camera by bringing the first device and the external device closer together to reduce the external proximity.

2. The method of claim 1, wherein the luminance is measured using a calculation of an arithmetic mean of a set of luminance values.

3. The method of claim 1, wherein if the measured luminance is at or above the predetermined luminance threshold, the microprocessor measures a secondary luminance and determines a secondary external proximity based on comparing the secondary luminance to the predetermined luminance threshold.

4. The method of claim 1, wherein the measured luminance comprises a set of luminance measurements such that each pixel in a light sensor of the first device is a luminance sensor.

5. The method of claim 4, wherein the pixels in the light sensor are equally divided into sections, and wherein the comparing comprises the microprocessor determining whether a predetermined number of the sections are below the predetermined luminance threshold.

6. The method of claim 1, wherein the luminance is measured using a calculation of an arithmetic mean of a set of luminance values; the microprocessor obtains an accelerometer measurement of the first device; the microprocessor determines a measured action from the accelerometer measurement; and the microprocessor uses the measured action as part of the comparing step.

7. The method of claim 1, wherein the first device is one of a mobile device, a tablet, and a laptop computer.

8. The method of claim 1, wherein the external device is one of a mobile device, a tablet, and a laptop computer.

9. The method of claim 1, further comprising the microprocessor notifying a user of a status of the determined proximity.

10. The method of claim 7, wherein the external device is one of a mobile device, a tablet, and a laptop computer.

11. A system comprising:
    a first device comprising a microprocessor and a computer-readable medium comprising instructions that cause the microprocessor to: measure a luminance related to an external proximity to establish a communication channel that is based on the external proximity; compare the measured luminance to a predetermined luminance threshold; and if the measured luminance is below the predetermined luminance threshold, to establish the communication channel, wherein the communication channel is established between the first device and an external device, the first device comprises a camera, and the luminance is measured using the camera by bringing the first device and the external device closer together to reduce the external proximity.

12. The system of claim 11, wherein the measured luminance is a weighted sum of red, green, and blue wavelengths, expressed by a formula: $L=0.59G+0.3R+.0.11B$, and wherein L is the measured luminance, G is a detected green light, R is a detected red light, and B is a detected blue light.

13. The system of claim 11, wherein if the luminance is at or above the predetermined luminance threshold, the instructions cause the microprocessor to measure a secondary luminance and determine a secondary proximity based on comparing the secondary luminance to the predetermined luminance threshold.

14. The system of claim 11, wherein the measured luminance comprises a set of luminance measurements.

15. The system of claim 14, wherein the comparing comprises the microprocessor determining whether a percentage of the set of luminance measurements is below the predetermined luminance threshold.

16. The system of claim 11, wherein a different device:
    obtains an accelerometer measurement of the first device;
    determines a measured action from the accelerometer measurement;
    determines that the measured action matches a predetermined pattern; and
    uses the matching of the measured action together with the luminance as part of the comparing step.

17. The system of claim 11, wherein the first device is a mobile device.

18. The system of claim 11, wherein the microprocessor obtains an image information for an object, and wherein the first device is a mobile device.

19. The system of claim 11, further comprising the microprocessor notifying a user of a status of a determined proximity based on the measured luminance.

20. The system of claim 11, wherein if the measured luminance is at or above the predetermined luminance threshold, the microprocessor repeats the measuring and the comparing until the luminance is below the predetermined luminance threshold.

* * * * *